June 28, 1966 H. C. HOLLAND 3,258,298
BRAKING SYSTEM

Filed Feb. 15, 1965 5 Sheets-Sheet 1

INVENTOR.
HARVISON C. HOLLAND
BY
ATTORNEY

June 28, 1966     H. C. HOLLAND     3,258,298
BRAKING SYSTEM
Filed Feb. 15, 1965     5 Sheets-Sheet 2
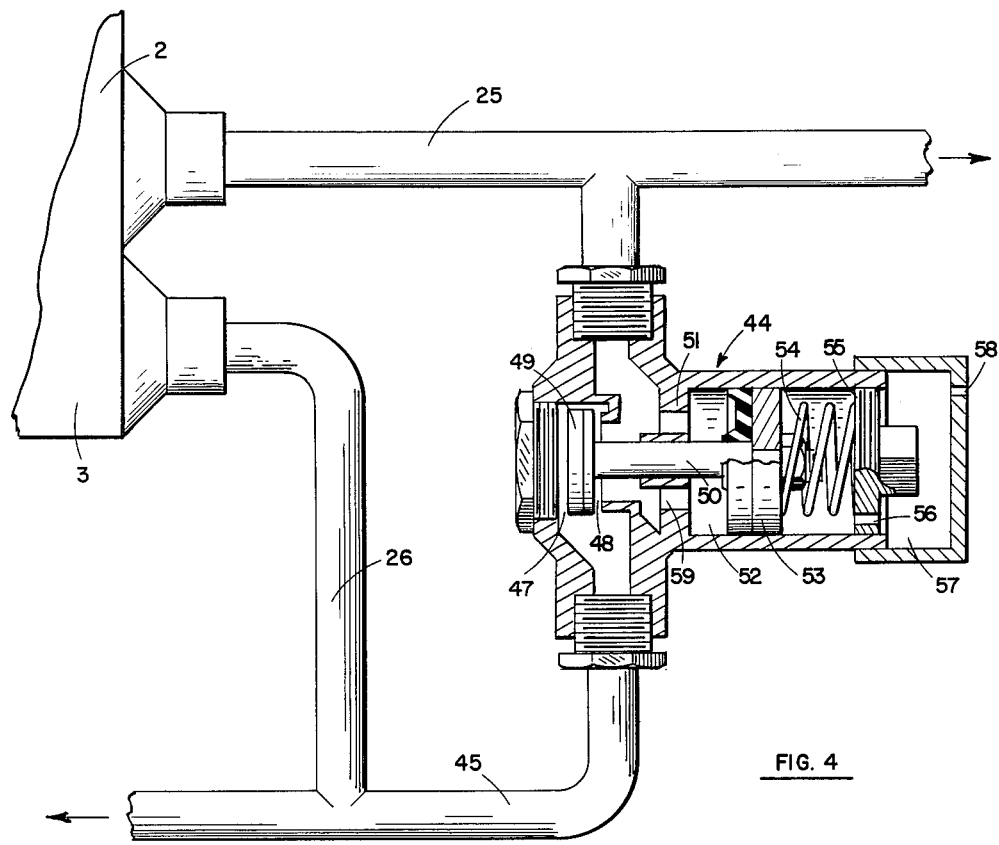
FIG. 4
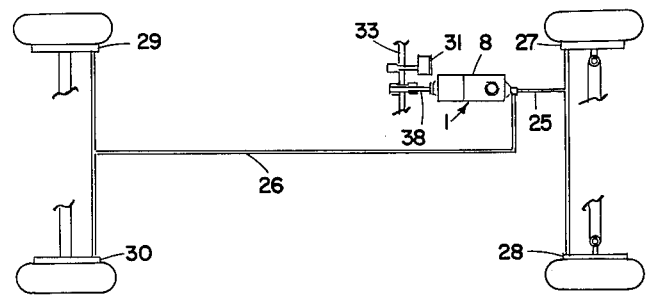
FIG. 2
INVENTOR.
HARVISON C. HOLLAND
BY
ATTORNEY June 28, 1966 H. C. HOLLAND 3,258,298
BRAKING SYSTEM
Filed Feb. 15, 1965 5 Sheets-Sheet 4
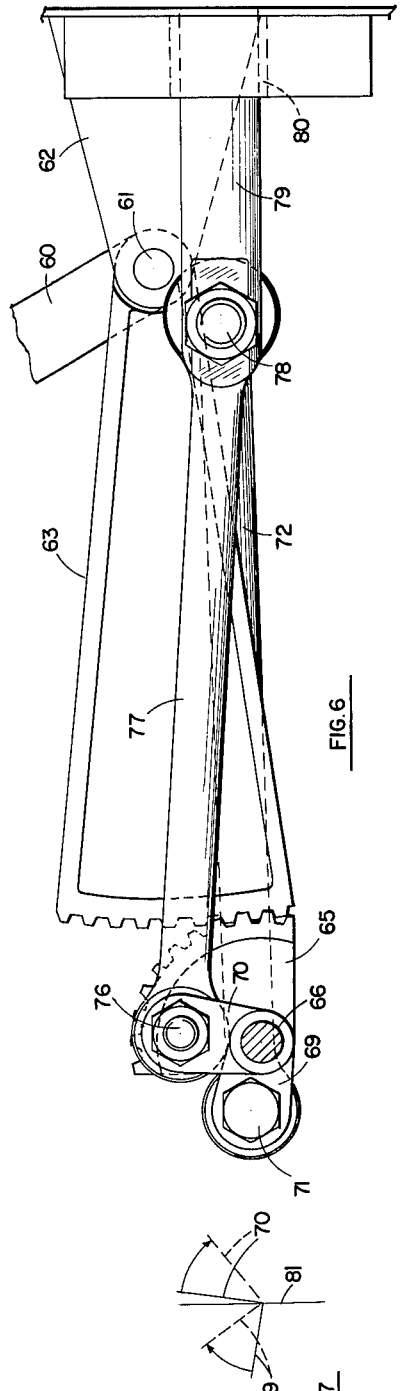
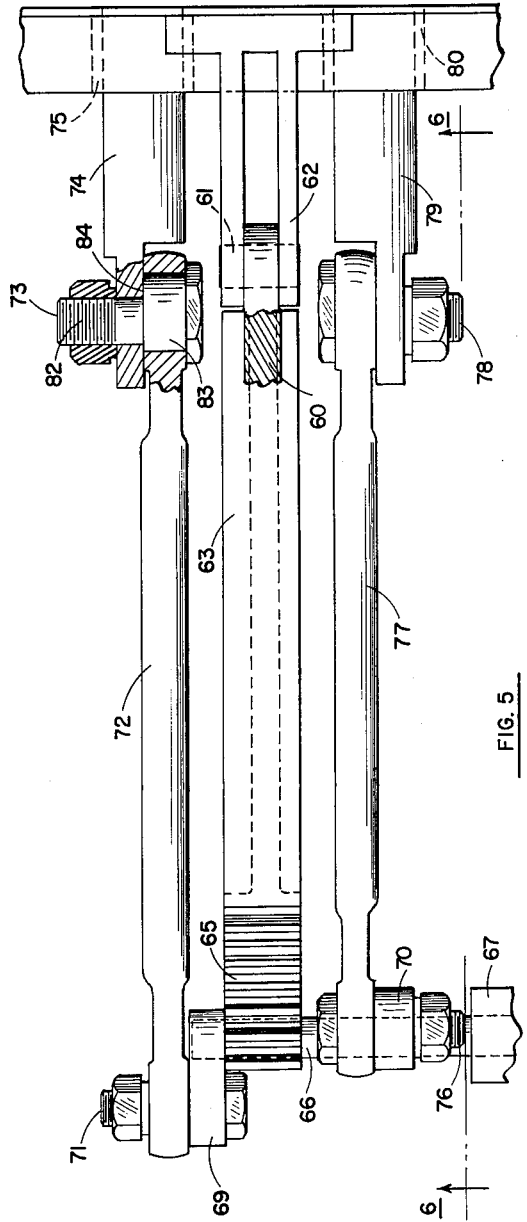
INVENTOR.
HARVISON C. HOLLAND
BY
ATTORNEYS June 28, 1966     H. C. HOLLAND     3,258,298
BRAKING SYSTEM
Filed Feb. 15, 1965     5 Sheets-Sheet 5
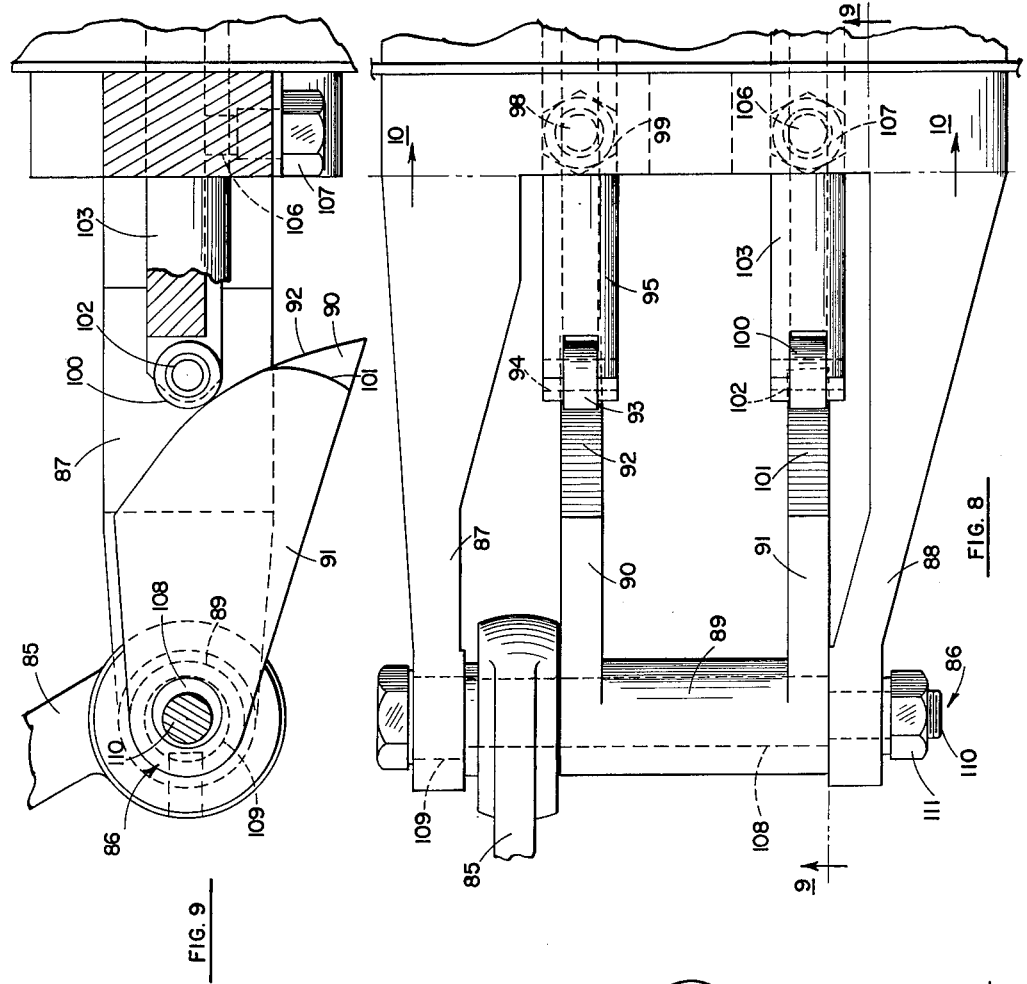
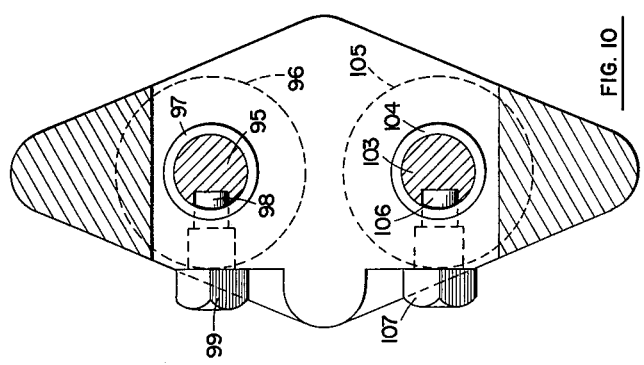
INVENTOR.
HARVISON C. HOLLAND
BY
ATTORNEYS

United States Patent Office 3,258,298
Patented June 28, 1966

3,258,298
BRAKING SYSTEM
Harvison C. Holland, 230 22nd St., Santa Monica, Calif.
Filed Feb. 15, 1965, Ser. No. 436,411
13 Claims. (Cl. 303—6)

This application is a continuation-in-part of my copending application Serial No. 225,526, filed September 24, 1962, for Braking System, now abandoned.

This invention pertains to the brakes of a vehicle and particularly to a means for properly distributing the braking forces to achieve maximum effectiveness.

In the stopping of a vehicle such as an automobile, truck or the like, a greater amount of decelerating force can be applied at the front wheels than at the rear. The center of gravity of the vehicle is located above and to the rear of the axes of the front wheels. When the vehicle is decelerated by applying the brakes, a force couple is produced that reacts downwardly on the front wheels as well as forwardly. Hence, the front wheels are pressed more tightly against the surface of the road as the vehicle is slowed. This also reduces vertical load on the rear wheels during deceleration. The faster the stop the greater the deceleration and the more pronounced is the effect. This means that the front wheels, with their greater downward load, have less tendency to slide than do the rear wheels where the load is reduced as the vehicle slows down. As a result, when the brake pedal is pushed for a rapid stop, the rear wheels will be caused to skid at a point considerably before a maximum braking force has been achieved at the front wheels. The lighter effective weight at the rear of the vehicle allows the rear wheels to commence a slide under such conditions. As soon as the skidding of the rear wheels is encountered, a major portion of their braking effectiveness is lost. The reduced coefficient of sliding friction of the tires of the rear wheels will offer far less resisting force than the higher coefficient of static friction that governs prior to the inception of the skid. Hence, the effect of the decelerating forces on the vehicle is to cause a loss of braking ability as the rear wheels slide while the front wheels continue to rotate. In addition, the sliding of the rear wheels will make the vehicle more difficult to control and can cause the vehicle to yaw or spin around.

In an effort to improve vehicle brakes it has become a frequent practice to provide larger wheel cylinders and more brake shoe lining area at the front wheels than at the rear. However, while this improves braking performance to a degree, it provides an optimum ratio of front to rear braking effort for only one coefficient of friction between the tires and the road. In practice this works out to be approximately that coefficient produced by wet streets. The result is that the rear wheels slide when the front wheels have developed only a portion of their maximum braking effort on dry paving and the front wheels slide when the rear wheels have developed only a portion of their maximum braking effort on snow or ice. In the latter case, ability to steer the vehicle is lost.

Furthermore, it results in excessive front end ducking of the vehicle, as well as concentrating the wear of the brakes at the front wheels for normal light to moderate braking forces. More brake adjustments become necessary also because of the unequally distributed brake loads.

The arrangement of this invention provides a simplified means by which the front brakes are made to exert a force that increases more rapidly than the force at the rear brake as the brake pedal is advanced. In other words, the more rapid the stop the higher the proportion of the stopping forces concentrated at the front wheels. This invention properly balances the braking forces between front and rear so that there will be no more tendency to slide at the back than at the front under all road conditions, wet or dry, slippery or not. This permits a maximum stopping force to be realized under all road conditions, while obviating the disadvantages noted above for other systems.

This is accomplished through the provision of a dual master cylinder, one cylinder of which serves the two front brake cylinders, while the other is for the rear brakes. The linkage connected to the brake pedal causes the piston in the front master cylinder to accelerate relative to the piston in the master cylinder for the rear system as the brake pedal is depressed. This may be accomplished through the use of two crank arms positioned to impart differential movement to the pistons. Alternatively, cams may be used to accomplish this result. When crank arms are utilized, gears preferably are included to increase the crank arm rotation relative to that of the brake pedal.

This relatively simple leakage causes the front brakes to exert an increasingly greater stopping force as the pedal is pressed inwardly. The system of this invention also assures that the brakes at the front and rear initially come into operation simultaneously, applying the greater braking force at the front only after this has been accomplished. This may result from an appropriately positioned port between the two master cylinders, closed off after one of the pistons has been moved a predetermined distance. Alternatively, in order to compensate for wear in the braking system, an automatically operable valve may disconnect to the two hydraulic systems only after an initial braking force has been encountered at both the front and rear of the vehicle.

It is an object of this invention to provide an improved braking system for vehicles.

Another object of this invention is to provide a vehicle braking system enabling the vehicle to stop in a minimum distance by appropriate distribution of braking forces.

A further object of this invention is to provide a braking system in which all of the wheels will exert a maximum braking force before any will start to slide.

An additional object of this invention is to provide an improved braking system usable with virtually any type of vehicle brakes.

Yet another object of this invention is to provide a braking system which distributes the force from a single pedal among the brakes at the wheels in proportion to the maximum total stopping force that the wheels can exert under all conditions.

These and other objects will become apparent from the following detailed description taken in connection with the accompany drawing in which:

FIGURE 2 is a schematic view showing the overall arrangement of the system as associated with a vehicle;

FIGURE 4 is a sectional view showing a means for preventing independent operation of the front and rear brakes prior to the engagement of the brakes both front and rear;

FIGURE 5 is a plan view of a different embodiment of the actuating mechanism in which gears are included to impart greater rotation to the crank arms;

FIGURE 6 is a longitudinal side elevational view, partially in section, taken along line 6—6 of FIGURE 5;

FIGURE 7 is a schematic view of the kinematics of the actuating crank arms;

FIGURE 8 is a plan view of an embodiment accomplishing the differential piston movement by the use of cams;

FIGURE 9 is a longitudinal sectional view taken along line 9—9 of FIGURE 8; and

FIGURE 10 is a transverse sectional view taken along line 10—10 of FIGURE 9.

Figure 1:
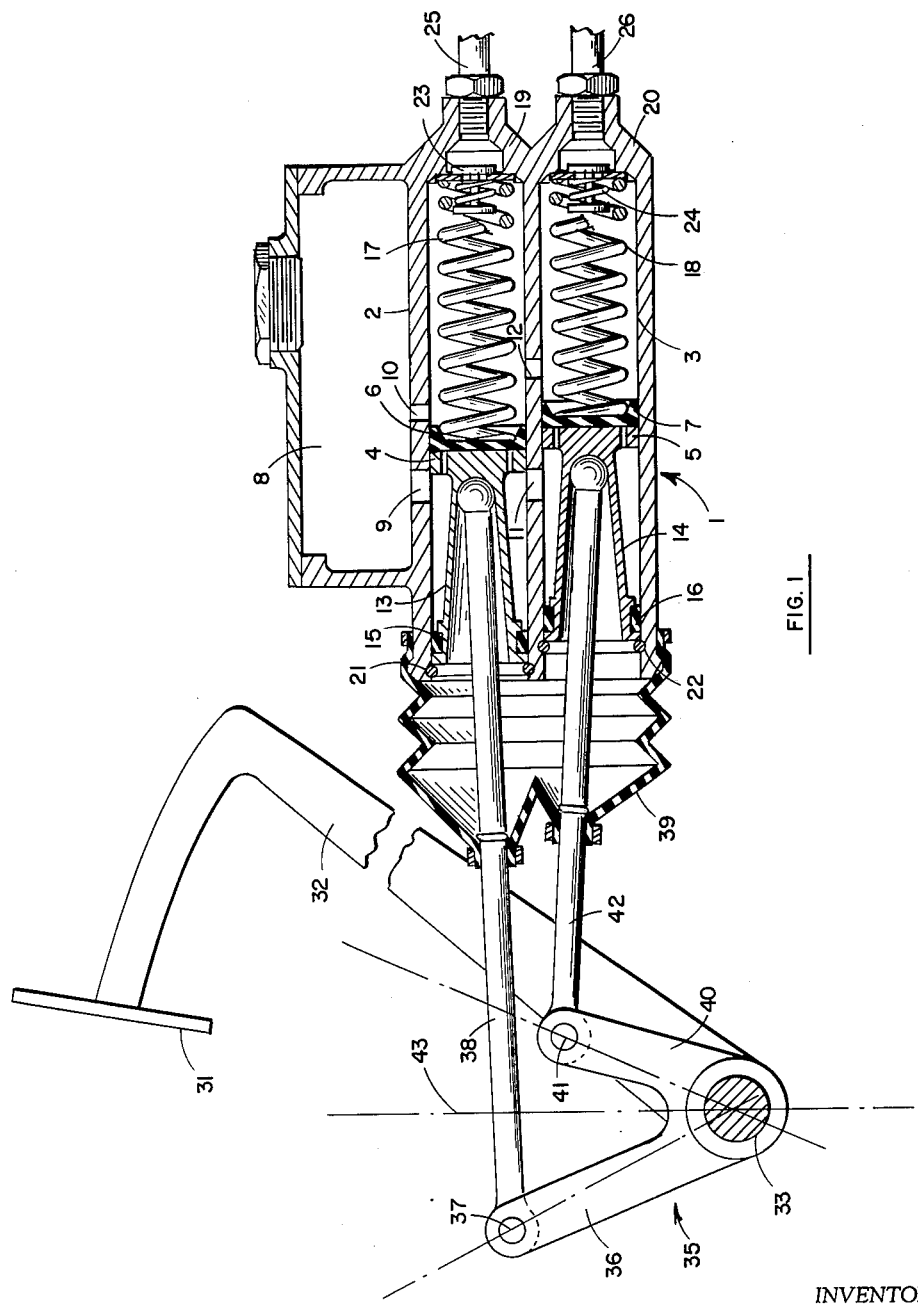
FIGURE 1 is a longitudinal sectional view illustrating the braking system of this invention.

With reference to FIGURE 1 of the drawing, the braking system of this invention includes a master cylinder assembly 1 made up of a duality of braking cylinders 2 and 3 arranged with their axes parallel. These cylinders may be of the same diameter and interiorly may be generally conventional insofar as their basic components are concerned. Hence, within the cylinders there are reciprocative pistons 4 and 5 that on their forward ends carry flexible cups 6 and 7 that seal against the cylinder walls. Hydraulic fluid is contained in reservoir 8 and enters cylinder 2 on both sides of the piston 4 through the ports 9 and 10. Additional ports 11 and 12 connect the fluid supply source to the other cylinder 3. The pistons 4 and 5 include rearward extensions 13 and 14 that at their distal ends carry sealing elements 15 and 16. On their other sides the pistons 4 and 5 are engaged by compression return springs 17 and 18 that extend to the opposite end walls 19 and 20 of the cylinders. These springs bias the pistons to their retracted positions illustrated where they engage stops 21 and 22. Two-way check valve assemblies 23 and 24 are included in the normal manner at the cylinder outlets. Lines 25 and 26 connect to the ends 19 and 20 of the cylinders 2 and 3 for conducting the hydraulic fluid to the wheel cylinders. As shown schematically in FIGURE 2, line 25 leads to the brakes 27 and 28 at the front wheels, while the line 26 connects to the rear wheel brakes 29 and 30. The brakes at the wheels may include conventional shoes and drums, or may be disc or other type of brakes. The system of this invention can be used with almost any kind of brakes at the wheels.

The brake pedal 31 includes an arm 32 that is pivotal about the axis of a shaft 33 which may be supported by the chassis of the vehicle. This shaft is spaced from the ends of the cylinders with its axis in a plane perpendicular to the plane of the axes of the cylinders. A bell crank 35 likewise is mounted on shaft 33 and is coupled to rotate with the arm 32. Therefore, when the pedal 31 is pushed downwardly, the bell crank 35 is caused to rotate about the axis of shaft 33 as a result of the movement of arm 32. This movement is clockwise as the invention is illustrated in FIGURE 1.

The bell crank 35 includes a relatively long arm 36 that by means of pivot pin 37 connects to a rod 38. The latter member extends through flexible rubber dust cover 39 into the end of the cylinder 2 of the front wheel system. There it engages the piston 4 so that the piston will be caused to move with the rod 38.

A shorter arm 40 of the bell crank connects by pin 41 to push rod 42 which extends into cylinder 3 for actuating the piston 5.

It can be seen, therefore, that when the brake pedal is pushed and the arm 32 rotated clockwise, the bell crank 35 is rotated toward the cylinders and causes the push rods 38 and 42 to move to the right. This, in turn, advances the two pistons 4 and 5 in the cylinders. After a relatively short travel of the piston 4, port 10 will be passed and the hydraulic fluid for both front and rear brakes in lines 25 and 26 becomes pressurized. Immediately thereafter, pistons 4 and 5 both pass port 12, cutting off communication between the cylinders 2 and 3 ahead of the pistons. Consequently, the front brake system, serviced through line 25, is separated and operated independently of the rear brake system receiving fluid from line 26 of the other cylinder 3.

This construction results in the application of a braking force at the front cylinders which increases more rapidly than that at the rear cylinders as the brake pedal is advanced through its travel. This is because the bell crank 35 gives more lineal movement to the rod 38 than it does to the rod 42. Arm 36 is longer than arm 40 of the bell crank, which means that a longer arc will be described at pivot pin 37 than at pin 41 as the bell crank rotates. The axis of cylinder 2 for the front wheels is spaced farther away from pivot shaft 33 than the axis of the other cylinder 3. Hence, rod 38 travels substantially tangential to the arc traversed by pin 37, and most of the arcuate distance is converted into a relatively large amount of rectilinear movement of piston 4.

Also, the arm 36 is located to the left of an imaginary line 43 which is normal to a projection of the axes of the cylinders 2 and 3 and extends from the pivot shaft 33. Bell crank arm 40, on the other hand, is positioned to the right of this line. The significance of this is that as the arm 36 rotates clockwise it imparts an ever-increasing proportion of movement along the line of the axis of cylinder 2, because it is approaching the line 43 perpendicular to that axis. At the same time, arm 40 moves away from the line 43 and thereby produces a continually decreasing amount of movement in the direction of the axis of cylinder 3 to the push rod 42. The result is that piston 4 moves farther and at an increasing rate as it approaches the outlet end of the cylinder. Piston 5 moves a lesser distance and decreases in its rate of movement as the end of the cylinder is neared. This means that the force applied at the front brakes becomes higher proportionately to that of the rear brakes as the brake pedal is advanced. This is precisely the effect needed in obtaining optimum stopping of the vehicle.

In this manner it is possible to obtain almost exactly the type of braking forces needed, thereby greatly increasing the ability of the brake system to stop the vehicle. It may be observed that the system operates on the linkage and master cylinders of the brake system, and hence is independent of the precise form of brakes that are used at the wheels. The important thing is that this system distributes the braking forces properly for all conditions giving a maximum stopping force for rapid deceleration while not overloading the front brakes during more gentle stops.

Figure 3:
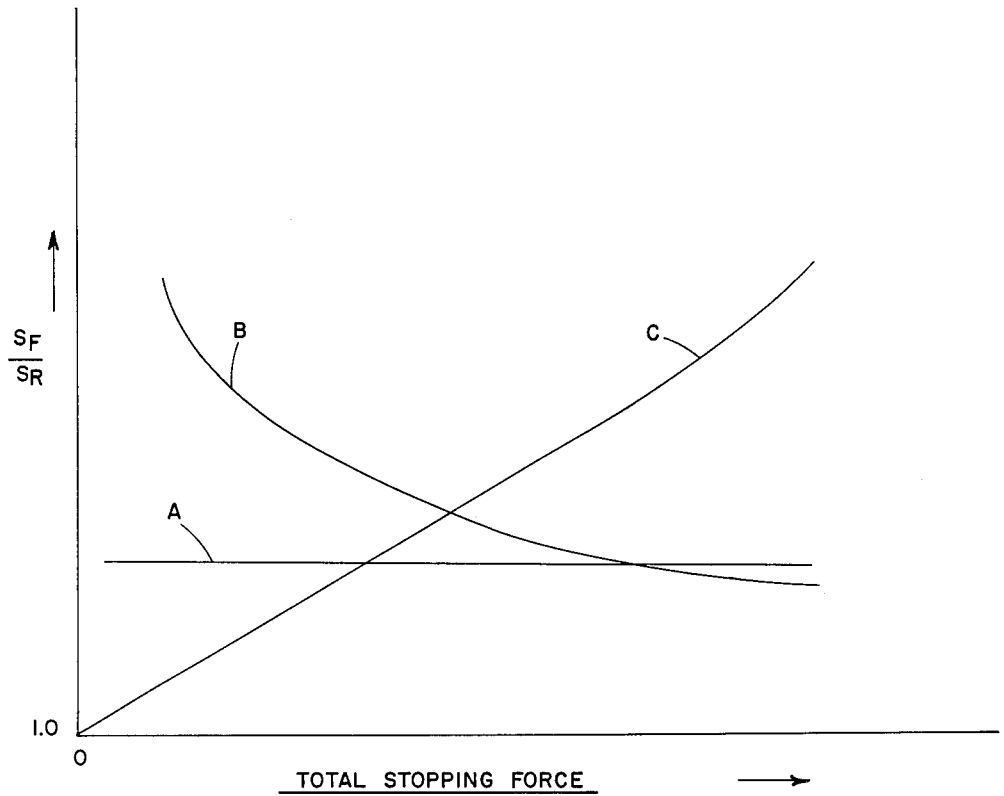
FIGURE 3 is a graph illustrating the braking effect achieved by the provisions of this invention compared with other braking arrangements.

The significance of the changing application of braking force front and rear may be observed from the graph of FIGURE 3. Here the abscissa represents the total braking force on the vehicle, while the ordinate is the ratio of stopping force at the front wheels to that at the rear. The curves are for conditions where the tires of the vehicle do not slide on the road surface. Curve A depicts the effect of a conventional braking system. The proportion of stopping force front to rear does not vary with the total force applied to stop the car no matter how great the rate of deceleration. Hence, curve A is merely a straight horizontal line. If the front brakes are made to lead the rear brakes, applying the shoes to the front drums before engagement at the rear, the results will follow curve B. It can be seen that for low stopping forces a much greater proportion is borne by the front brakes, but that the ratio decreases as stopping force becomes larger. Hence, instead of the front brakes absorbing a greater share of the braking load as their ability to resist rotation without skidding the front wheels becomes larger, the opposite is true and the curve drops off to the right.

It can be demonstrated both mathematically and empirically that curve C represents ideal conditions for deceleration. As indicated, the ratio of front to rear stopping force becomes larger with increased total braking force. Thus, the curve inclines upwardly to the right. The braking system of this invention provides a very close approximation of curve C, increasing the ratio in substantially the same manner.

The aperture 12 interconnecting the cylinders 2 and 3 does more than assure that both cylinders are released and equalized at the beginning of the braking stroke of the pistons. It also prevents the brakes at the front from being applied to the brake drums prior to the engagement of the rear brakes. It would be a safety hazard if the front brakes came into actuation before the rear brakes and also would lead to excessive wear at the front, loss of adjustment, and nosing down on light brake applications. Therefore, by positioning the aperture 12 axially inward of the piston 5 in the retracted position, the brake systems for the front and rear wheels are interconnected and act together for the initial portion of the movement of the brake pedal. It is only after the piston 5 reaches the aperture 12 that the two systems are separated and become independent. The simple provision of the aperture 12 at a position spaced a predetermined distance from piston 5, therefore, normally assures that the brakes will operate together and that undesirable effects will not be encountered through the use of the system of this invention.

However, the aperture 12 is a sufficient means for separating the hydraulic actuation of the front and the rear brakes to produce the foregoing described results only when wheel brake mechanism adjustment is such that the shoes contact the drums at the same time that piston 5 closes aperture 12. This condition can be expected to hold over a long period of time when the wheel brakes include self-adjusting features. Otherwise, when the brakes have worn, aperture 12 will close before the brake shoes have contacted the drums, which will cause the front brakes to lead the rear brakes. This will result in performance similar to that indicated by curve B of FIGURE 3.

In order to prevent any such occurrence, the arrangement shown in FIGURE 4 may be provided in connection with the system of this invention. This includes a valve unit 44 located in a bypass line 45 between the line 25 to the front brakes and the line 26 to the rear brakes. Valve unit 44 includes a central chamber 47 having a valve seat 48 which may be engaged by an axially movable valve element 49. A stem 50 extends from the member 49 through a wall 51 to a chamber 52. Within the chamber 52 is a reciprocative piston 53 connected to the end of stem 50. A compression spring 54 is interposed between the end wall 55 of the cylinder 52 and the face of the piston 53. A vent opening 56 is provided in wall 55 which is covered over by a dust boot 57. The latter element also includes a vent opening 58.

In operation of the arrangement of FIGURE 4, upon initial movement of the brake pedal there will be free communication of fluid through the bypass line 45, permitting circulation through the open valve unit 44. This is because the spring 54 biases the piston 53 and hence the valve member 49 to the left, as illustrated, away from the valve seat 48. Until such time as both sets of brakes are engaged, the bypass will merely transmit fluid, and pressure will not develop at the valve. As soon as the brakes are in engagement both front and rear, however, there will be a resisting force built up in both line 25 and line 26. This causes a back pressure in the bypass line 45 and also in the valve chamber 47. The fluid in the valve is free to pass through openings 59 in the wall 51 between chamber 47 and the cylinder 52. This pressure then reacts against the face of piston 53 overcoming the resisting force of spring 54. Thus, the fluid in the hydraulic lines from the brake cylinders reacts against the piston to move the piston to the right. Thus, through stem 50, causes the valve member 44 to contact the seat 48. As a result, the bypass 45 is closed and the two brake systems are separated.

Therefore, the valve element 44 assures that when both the front and rear brakes are in engagement the two systems are cut off from each other and can operate independently in the intended manner. Since the valve unit 44 operates on the basis of a resisting force from both the front and rear brakes it will not close off the bypass until the brake shoes are in engagement at both sets of wheels. Brake adjustment has no effect on the valve unit 44. Accordingly, in some instances it is desired to utilize the valve arrangement between the two brake systems to assure that the arrangement of this invention will always operate satisfactorily.

In order to preserve the proper relationship of the angular movement for the crank arms used in actuating the pistons in the front and rear systems, while at the same time utilizing a normal increment of travel for the brake pedal, it is necessary in many vehicles to provide an increase in the rotation of the crank arms that drive the pistons over the rotation of the arm of the brake pedal. As pointed out above, it is important to assure that the piston in the cylinder for the front system accelerates at a controlled rate relative to the piston for the rear system at the time these systems are separated and the brake shoes engage the drums. If optimum braking is to be realized, the distances traveled and the rates of movement of the pistons in the master cylinders for the two systems must be in accordance with exact values. In accomplishing this, their crank arms should be of predetermined lengths and rotate through established arcs, carefully located with respect to the center lines of the cylinders. By this arrangement, one crank arm approaches the vertical with respect to the cylinder axes, while the other crank arm moves away from the vertical line. Nevertheless, with the driver in a seated position while applying the brakes, the movement of the foot in pressing on the brake pedal is limited. If the brake application requires too long an increment of travel of the brake pedal, the operator of the vehicle will have great difficulty in moving the brake pedal a sufficient distance. This is particularly true in view of the habits motorists have acquired in operating brakes of conventional design.

In correlating the appropriate amount of brake pedal movement with that of the crank arms, gearing may be included in the operating mechanism as illustrated in the embodiments of FIGURES 5 and 6. This allows the crank arms to be relatively short and to travel through larger arcs than the arc traversed by the brake pedal. This arrangement illustrates the brake cylinders mounted side by side rather than one above the other as in the version of FIGURES 1 through 4. The positioning of the cylinders in this regard is optional.

As shown in FIGURES 5 and 6, the brake pedal arm 60 is rotatable in a counterclockwise direction about its mounting pin 61 as the pedal is depressed to apply the brakes. A bifurcated bracket 62 is used to rotatably support the pin 61. Also mounted on the pin 61 and connected to the pedal arm 60 is a gear sector 63 which moves with the brake pedal arm 60 and through an identical arc to that described by the brake pedal arm as the brakes are applied.

Meshing with the sector 63 is a second gear sector 65, rotatable about a shaft 66. A suitable bearing support, such as the bearing 67 shown in FIGURE 5, is used to mount the shaft 66 on the vehicle. The radius between the center line of the shaft 66 and the pitch line of the teeth of the sector 65 is less than the radius between the center line of pin 61 and the pitch line of the teeth of the sector 63. Hence, the effect is that of driving a smaller gear by a larger one so that the rotation of the sector 63 produces a larger arc of rotation of the sector 65. The amount of arc amplification achieved in this manner will depend upon the individual system involved. In a typical example, a six to one gear ratio is used.

Rotating with the shaft 66 are crank arms 69 and 70. The former is used to drive the piston in the cylinder connected to the front brakes, while the latter actuates the piston for the rear brakes. A pin 71 at the outer end of the crank arm 69 connects this arm to a push rod 72. The latter element, through pin 73, is connected to piston rod 74 which is movable axially in a bearing 75 at the outer end of the master cylinder for the front system. Therefore, when the sector 65 is rotated in a clockwise direction by counterclockwise rotation of the sector 63, rectilinear movement is imparted to the piston rod 74 through the push rod 72. The rod 74 at its inner end (not shown) connects with the piston for the front master cylinder, thereby displacing the fluid in the front master cylinder in the manner previously described.

Similarly, the rotation given the drive crank arm 70 is transmitted through a connecting pin 76 to a push rod 77. The opposite end of the rod 77 is joined by a pivot pin 78 to a piston rod 79 which extends into the cylinder for the rear brake system and is axially slidable in a bearing 80. Consequently, the pistons in both master cylinders are moved through their strokes by the action of the brake pedal, although the drive arms for the systems are moved through a greater arc than is the brake pedal.

With reference to the schematic illustration of FIGURE 7, it may be seen that in the power stroke the crank arm 69 for the front system approaches the vertical line 81 that is normal to the axes of the two master cylinders. At the same time, the crank arm 70 recedes from the vertical line 81. Consequently, at the time when the front and rear systems are separated, the piston in the front cylinder will be caused to accelerate relative to the piston in the rear master cylinder. This enables the results shown graphically by the curve C in FIGURE 3 to be obtained. As before, the braking effort at the front wheels will be continually increased over that at the rear as the brake pedal is depressed further. Therefore, the brakes at the front of the vehicle will be called upon to exert an increasing amount of decelerating force proportionate to that of the brakes at the rear of the vehicle as the total stopping force becomes greater.

The mechanism utilized with this invention is designed to take into account an unapparent characteristic of flexibility that exists in any hydraulic system. While commonly thought of as incompressible, the hydraulic fluid actually becomes compressed a small amount when the braking force is applied to it. This decrease in fluid volume under pressure plus the elasticity of the steel lines, cylinders and shoes, as well as that of the rubber hoses, sealing cups, asbestos linings, etc., that make up the hydraulic circuit, result in an elastic characteristic of the complete system. This elastic characteristic of the system is sometimes referred to as its stiffness. The elasticity is responsible for the travel of the brake pedal or other part used in producing a pressure change in the hydraulic system as the brakes are applied. Thus, as the braking force is increased, the brake pedal will continue to move even though there is contact between the brake shoes and the drums because of the elasticity in the system.

By separating the hydraulic system for the front wheels from that for the rear and compressing the front wheel system at an accelerating rate with respect to the rear wheel system, it is possible to produce braking forces at the front and rear wheels corresponding to those ideally required. In other words, the curve of available braking force in this manner can be made to match the ideal curve of required braking force indicated by the curve C in FIGURE 3. The curve of ideal required braking force, in turn, is calculated from the relationship between the center of gravity of the vehicle and the contact points of the tires to the road at various coefficients of friction between the tires and the road. Hence, the ideal curve of required braking force is a function of the geometry of the vehicle. The actual braking force available is made to follow the ideal curve by properly relating the motion of the pistons in the front and rear system master cylinders. In establishing the piston movements required to permit the ideal curve C of FIGURE 3 to be followed, it is necessary to make allowance for the stiffnesses of the front and rear systems, as well as the relative sizes of the front and rear wheel systems and the front and rear system master cylinders.

It may be noted that the crank arm 70 for the rear system is slightly longer than the crank arm 69 for actuating the front brakes. Nevertheless, the acceleration of the piston in the front system relative to the piston for the rear system will take place during the time when the two systems are separated (the last third of the travel of the crank arms). This results from the fact that the crank for the front system 69 is approaching the perpendicular line 81, whereas the crank for the rear system is approaching a point 90° from this line. The trigonometric relationships controlling such motion are apparent from FIGURE 7. The stiffnesses of the front and the rear systems, as well as the sizes of the wheel cylinders, the master cylinders, the angle between the crank arms and the angle of the crank arms when the systems are separated, will determine the length of each crank arm. Thus, each particular vehicle configuration will determine its appropriate crank arm length.

The embodiment of FIGURES 5 and 6, therefore, accomplishes basically the same objectives of the previously described arrangement, but assures that the brake pedal can be moved through a normal amount of travel in applying the brakes. Nevertheless, the gearing between the brake pedal and the crank arms is a relatively simple device that is economical to construct and incorporate in the mechanism.

As an added feature to assure correct application of the front and rear brakes, the effective lengths of the push rods 72 and 77 are adjustable, this being accomplished by providing eccentrics in the bolts 73 and 78. Thus, as shown for bolt 73, the threaded shank 82 is offset from and of smaller diameter than the portion 83 that fits through the push rod 72. The bolt 73 may be rotationally positioned to establish its effective length at a desired value with respect to the piston and the crank arm 69, at which time the nut is tightened to clamp the bolt shoulder 84 against the side of the piston rod 74. When the mechanism is actuated, the rod 72 rotates around the portion 83 of the bolt 73. The bolt 78 is constructed in a similar manner.

This adjustment allows the linkage to be set so that the front and rear hydraulic systems become separated at the time when the crank arms are at their correct rotational positions to subsequently generate the required strokes and differential displacement of the pistons. In utilizing the valve 44 of FIGURE 4, the front and rear systems have become separated upon generation of a predetermined back pressure, as described above. This back pressure can be created only when the ports or valves on the forward sides of the pistons in the master cylinders are closed to shut off communication with the reservoir. In other words, a back pressure can be generated only when the port 10 is closed in the design shown in FIGURE 1, so that fluid is not merely circulated to the reservoir and the back sides of the pistons as the pistons move. The adjustment in effective lengths of the push rods 72 and 77, as afforded by the eccentric connecting bolts 73 and 78, allows the pistons to be adjusted properly relative to the reservoir shutoff ports to result in the generation of the critical back pressure at the proper rotational positions of the crank arms 69 and 70.

Another means for causing the appropriate movement of the two pistons in the master cylinder with the acceleration of one piston relative to the other is accomplished by the arrangement shown in FIGURES 8, 9 and 10. Here, the brake pedal 85 turns the transverse shaft 86 which is rotatably supported at the ends of brackets 87 and 88. This shaft pivots with it a sleeve 89, from which extends a pair of spaced cam members 90 and 91. The cam 90 has a curved actuating surface 92 of a predetermined profile, which is engaged by a follower roller 93, rotatably mounted by pin 94 on a piston rod 95. This is the piston rod for the master cylinder 96 for the front brake system. The piston rod 95 slides axially in a bearing 97, and is prevented from rotation by being slotted on its underside, providing an axial recess into which fits the end 98 of a screw 99.

A cam follower 100 bears against the curved profile 101 of the other cam 91. The follower 100 is mounted by pin 102 on the end of piston rod 103. The latter member is the piston rod for the rear brake system, extending through a sleeve bearing 104 into the rear master cylinder 105. The end 106 of a screw 107 fits in an axial slot in the rod 103 to prevent rotation of the rod.

It may be observed that the profile surfaces 92 and 101 of the two cams are the same adjacent their followers when the brakes are in the retracted positions shown in FIGURES 8 and 9. However, the surface 101 curves inwardly with respect to the surface 92 at the power portions of these surfaces. When the cams are rotated in a counterclockwise direction as viewed in FIGURE 9 by rotation of the shaft 86 by the brake pedal, they move the piston rods 95 and 103 rectilinearly to the right, as illustrated, thereby driving the pistons in the master cylinders through their strokes in applying the brakes. At first, the pistons will move together because the cam surfaces are alike where the the followers are engaged. However, when the lower portions of the profiles 92 and 101 are reached, the rod 95 for the front system will accelerate relative to the rod 103 for the rear system. Hence, the piston in the front master cylinder will accelerate relative to the piston in the rear master cylinder as these portions of the cams are brought into play.

Again, therefore, the necessary acceleration of one piston relative to the other is achieved. The two pistons are moved together for the initial increment of their travel because this is the distance which must be moved in bringing the brake shoes into contact with the brake drums. However, after the brake drums have been contacted, the required amount of acceleration of the front piston relative to the rear takes place. Consequently, the effect insofar as the front and rear brakes are concerned is the same as described above with the mechanism utilizing cams rather than crank arms to bring about the differential movement.

The rotational positions of the cams 90 and 91 are adjustable relative to the cam followers 93 and 100 for the same reasons that the effective lengths of the push rods 72 and 77 of the embodiment of FIGURES 5 and 6 are adjustable. This is to assure that the proper portions of the cam profiles are contacted by the followers when the back pressure builds up to a value sufficient to close the valve 44.

The cam adjustment is accomplished by providing an eccentric portion on the shaft 86. The central portion 108 of the shaft 86, which passes through the cam sleeve 89 is offcenter with respect to the ends 109 and 110 of the shaft. Therefore, when the nut 111 is loosened, the shaft 86 may be rotated to vary the positions of the cam profiles 92 and 101 with respect to the followers 93 and 100. Then the nut 111 is tightened to retain the adjustment.

From the foregoing description it can be seen that I have provided an improved braking system assuring an optimum stopping effect by properly balancing the forces at the front and rear wheels of the vehicle. No longer will it be characteristic of the brakes to slide at the rear during rapid deceleration. Also, there is no disproportionally high braking force at the front during light braking conditions. Despite the improved braking effort afforded by the teachings of this invention, the construction is relatively simple and can be accomplished at a low cost.

The foregoing detailed description is to be clearly understood as given by way of illustration and example only, the spirit and scope of this invention being limited solely by the appended claims.

I claim:
1. In combination with a vehicle, a braking arrangement for said vehicle comprising
front wheel brakes, rear wheel brakes,
a duality of hydraulic systems, each of said systems including a master hydraulic cylinder,
the first of said systems being connected to said front wheel brakes,
and the second of said systems being connected to said rear wheel brakes,
a first piston in said first cylinder,
a second piston in said second cylinder
each of said pistons being movable through a stroke for forcing hydraulic fluid to the brakes at the wheels,
actuating means for said pistons, said actuating means including
a first pivotal arm connected to said first piston for determining the movement of said first piston through its stroke,
a second pivotal arm connected to said second piston for determining the movement of said second piston through its stroke,
and means for simultaneously rotating said pivotal arms through equal arcs,
said pivotal arms being positioned such that said first pivotal arm establishes movement of said first piston at a rate accelerated with respect to the movement imparted to said second piston during at least a substantial portion of said strokes of said pistons,
and means for interconnecting said system during initial portions of said strokes until both said front wheel brakes and said rear wheel brakes are applied, and for separating said systems following such application of said brakes during the remainder of said strokes.

2. In combination with a vehicle having hydraulic brakes at the front wheels thereof and at the rear wheels thereof, a braking system comprising
a duality of hydraulic systems, each of said systems including a master hydraulic cylinder,
the first of said systems being operatively connected to said brakes at the front wheels, the second of said systems being operatively connected to said brakes at the rear wheels,
a piston in each of said cylinders for forcing fluid therefrom in the system thereof in a pressure stroke of such piston from a retracted to an extended position,
a brake pedal,
means rotatably mounting said brake pedal on said vehicle,
means interconnecting said brake pedal and said pistons for translating rotation of said brake pedal into rectilinear movement of said pistons through said strokes,
said translating means including means for causing said piston in said first cylinder to accelerate relative to said piston in said second cylinder during at least a substantial portion of said strokes of said pistons,
and means for interconnecting said systems during initial portions of said pressure strokes until substantially the point of application of said brakes at said front wheels and at said rear wheels and for separating said systems following such application of said brakes.

3. In combination with a vehicle having hydraulic brakes at the front wheels thereof and at the rear wheels thereof, a braking system comprising
a duality of hydraulic systems, each of said systems including a master hydraulic cylinder,
the first of said systems being operatively connected to said brakes at the front wheels, the second of said systems being operatively connected to said brakes at the rear wheels,
a piston in each of said cylinders for forcing fluid therefrom in the system thereof in a pressure stroke of such piston from a retracted to an extended position,
a brake pedal,
means rotatably mounting said brake pedal on said vehicle, a duality of crank arms,
    said crank arms being operatively connected with said pistons for imparting rectilinear movement to said pistons upon rotation of said crank arms to drive said pistons through said strokes,
    said crank arms being positioned such that the crank arms connected to the piston for said first cylinder imparts rectilinear movement thereto at an accelerating rate with respect to the rectilinear movement imparted to said piston in said second cylinder,
means interconnecting said brake pedal and said crank arms for causing said crank arms to rotate simultaneously with said brake pedal and to rotate through a larger arc than that of said brake pedal,
and means for interconnecting said systems during initial portions of said pressure strokes substantially until the time of application of the brakes at said front wheels and at said rear wheels and for separating said systems following such application of said brakes.

4. In combination with a vehicle having hydraulic brakes at the front wheels thereof and at the rear wheels thereof, a braking system comprising
a duality of axially parallel master hydraulic cylinders,
    the first of said cylinders being operatively connected to said brakes at the front wheels,
    the second of said cylinders being operatively connected to said brakes at the rear wheels,
a piston in each of said cylinders for forcing fluid therefrom in a pressure stroke from a retracted to an extended position,
a brake pedal,
means rotatably mounting said brake pedal on said vehicle,
a first gear rotatable by said brake pedal,
a second gear meshingly engaging said first gear,
and a duality of crank arms simultaneously rotatable with said second gear,
    said crank arms being operatively connected with said pistons for imparting rectilinear movement to said pistons upon rotation of said crank arms to drive said pistons through said strokes,
    said crank arms being positioned such that the crank arm connected to the piston for said first cylinder imparts rectilinear movement thereto at an accelerating rate with respect to the rectilinear movement imparted to said piston in said second cylinder,
    said first gear having a larger pitch circle than that of said second gear for thereby causing said crank arms to rotate through a greater arc than said brake pedal.

5. A device as recited in claim 4 in which for causing said accelerating rectilinear movement of said piston in said first cylinder the crank arm operatively connected thereto is arranged upon said rotation thereof to approach an imaginary line normal to an extension of the axis of said cylinders, and said crank arm for said piston in said second cylinder upon said rotation thereof is arranged to move away from said imaginary line.

6. In combination with a vehicle having hydraulic brakes at the front wheels thereof and at the rear wheels thereof, a braking system comprising
a duality of hydraulic systems, each of said systems including a master hydraulic cylinder,
    the first of said systems being operatively connected to said brakes at the front wheels,
    the second of said systems being operatively connected to said brakes at the rear wheels,
a piston in each of said cylinders for forcing fluid therefrom in the system thereof in a pressure stroke of such piston from a retracted to an extended position,
a brake pedal,
means rotatably mounting said brake pedal on said vehicle,
means interconnecting said brake pedal and said pistons for translating rotation of said brake pedal into rectilinear movement of said pistons through said strokes,
    said translating means including a cam means for controlling the rates of movement of said pistons,
    and causing said piston in said first cylinder to accelerate relative to said piston in said second cylinder during at least a substantial portion of said strokes of said pistons,
and means for interconnecting said systems during initial portions of said pressure strokes substantially until the time of application of the brakes at said front wheels and at said rear wheels and for separating said systems following such application of said brakes.

7. In combination with a vehicle having front hydraulic brakes and rear hydraulic brakes, a braking system comprising
a duality of hydraulic master cylinders mounted on said vehicle with their axes parallel,
    the first of said cylinders having an outlet connected to said front brakes,
    the second of said cylinders having an outlet connected to said rear brakes,
a piston in each of said cylinders
    movable through a stroke toward said outlet from a retracted position to an extended position,
a brake pedal,
means rotatably mounting said brake pedal on said vehicle,
a first gear rotatable by and simultaneously with said brake pedal,
a second gear meshingly engaging said first gear and rotatable thereby,
means mounting said second gear on said vehicle for rotation of said second gear about an axis,
    said second gear having a pitch radius shorter than the pitch radius of said first gear,
        whereby said second gear rotates through a greater arc than said first gear upon rotation of said brake pedal,
a duality of crank arms rotatable by and simultaneously with said second gear about said axis of said second gear,
    the first of said crank arms being operatively connected to the piston of said first cylinder,
    the second of said crank arms being operatively connected to the piston of said second cylinder for imparting rectilinear movement to said pistons upon rotation of said crank arms,
    said first crank arm being positioned to approach an imaginary line normal to a projection of the axes of said cylinders,
    and said second crank arm being positioned to move away from said imaginary line upon said rotation of said crank arms.

8. In combination with a vehicle having front hydraulic brakes and rear hydraulic brakes, a braking system comprising
a duality of hydraulic master cylinders mounted on said vehicle with their axes parallel,
    the first of said cylinders having an outlet connected to said front brakes,
    the second of said cylinders having an outlet connected to said rear brakes,
a piston in each of said cylinders
    movable through a stroke toward said outlet from a retracted position to an extended position,
a brake pedal, means rotatably mounting said brake pedal on said vehicle, a duality of cams, means rotatably mounting said cams on said vehicle, the first of said cams engaging the piston in said first cylinder for moving said piston in said first cylinder through said stroke, the second of said cams engaging the piston in said second cylinder for moving said piston in said second cylinder through said stroke, and means interconnecting said brake pedal and said cams for rotating said cams simultaneously with said brake pedal, said cams being contoured to move said piston in said first cylinder at an accelerated rate with respect to said piston in said second cylinder during at least the latter portions of said strokes of said pistons.

9. In combination with a vehicle having hydraulic brakes at the front wheels thereof and at the rear wheels thereof, a braking system comprising a duality of axially parallel master hydraulic cylinders, the first of said cylinders being operatively connected to said brakes at the front wheels, the second of said cylinders being operatively connected to said brakes at the rear wheels, a piston in each of said cylinders for forcing fluid therefrom in a pressure stroke from a retracted to an extended position, a brake pedal, means rotatably mounting said brake pedal on said vehicle, a duality of crank arms rotatable by said brake pedal, means operatively connecting said crank arms with said pistons in said cylinders for imparting movement to said pistons to drive said pistons through said strokes upon rotation of said crank arms by said brake pedal, said crank arms being positioned with respect to an imaginary line normal to an extension of the axes of said cylinders such that upon such rotation of said crank arms the crank arm operatively connected to said piston in said first cylinder approaches said line, and said crank arm operatively connected to said piston in said second cylinder moves away from said line.

10. A device as recited in claim 9 including in addition means for causing said crank arms to rotate through greater arcs than the arc of rotation of said brake pedal upon actuation of said brake pedal.

11. A device as recited in claim 9 including a passageway interconnecting said cylinders, said passageway communicating with the circumferential wall of said second cylinder a predetermined axial distance from the piston therein when said last-mentioned piston is in said retracted position.

12. A device as recited in claim 9 including a bypass interconnecting said outlets of said cylinders, and a pressure responsive valve means in said bypass for closing said bypass upon generation of substantial back pressure from both said front brakes and said rear brakes.

13. A device as recited in claim 12 in which said valve means includes a chamber series-connected in said bypass, a valve member in said chamber, a valve seat in said chamber engageable by said valve member for closing said valve, a third cylinder communicating with said chamber, a third piston in said third cylinder, means interconnecting said valve member and said piston whereby said piston in response to fluid pressure in said third cylinder from said chamber urges said valve member toward said valve seat for closing said bypass, and resilient means biasing said piston to a position where said piston holds said valve member in a spaced relationship with said valve seat for opening said bypass.

References Cited by the Examiner

UNITED STATES PATENTS

| 1,969,872 | 8/1934 | Bowen | 188—152 |
| 2,068,150 | 1/1937 | Oliver | 60—54.5 |
| 2,160,308 | 5/1939 | Edmonds | 188—204 |
| 3,066,489 | 12/1962 | Johnson | 188—152 |

FOREIGN PATENTS 444,955   3/1936   Great Britain.

EUGENE G. BOTZ, *Primary Examiner.*